United States Patent Office 3,594,381
Patented July 20, 1971

3,594,381
PROCESS FOR THE PREPARATION OF BENZO-PHENAZINE-DI-N-OXIDES
Florin Seng, Cologne-Buchheim, and Kurt Ley, Odenthal-Globusch, Germany, assignors to Farbenfabriken Bayer Aktiengesellschaft, Leverkusen, Germany
No Drawing. Filed Jan. 27, 1969, Ser. No. 794,346
Claims priority, application Germany, Feb. 28, 1968, P 16 70 991.4
Int. Cl. C07d 51/80
U.S. Cl. 260—266                    17 Claims

ABSTRACT OF THE DISCLOSURE

Reacting [optionally 4- and/or 5-(halo, alkyl, alkoxy, aminocarbonyl and/or aminosulfonyl)-substituted]-benzofuroxazan with [optionally 3-, 4-, 5-, 6-, 7- and/or 8-, especially mono or di (nitro, halo, sulfonic acid, sulfonic acid alkali metal salt, carboxy, amino, alkyl-sulfonyl-amino, alkyl-carbonylamino and/or chloro-substituted phenyl-carbonylamino)-substituted]- naphth- 1 or 2-ols, for example at temperatures of about 0–100° C., in the presence of a base or basic-reacting salt such as alkali metal -alcoholates, -hydroxides, -cyanides, -carbonates, alkaline earth metal hydroxides, and/or organic amines including ammonia, and also in the presence of a diluent such as water and/or organic liquids, to form the corresponding [optionally 2- and/or 3-(halo, alkyl, alkoxy, aminocarbonyl and/or aminosulfonyl)-substituted]-[optionally 5-, 6-, 7-, 8-, 9- and/or 10-, especially mono or di, (nitro, halo, sulfonic acid, sulfonic acid alkali metal salt, carboxy, amino, alkyl-sulfonylamino, alkyl-carbonylamino, and/or chloro-substituted phenyl-carbonylamino)-substituted]-ortho-benzo-phenazine-di-N-oxides, all but the corresponding unsubstituted compound of which are new and all of which possess fungicidal properties.

---

The present invention relates to and has for its objects the provision for particular new methods of producing [optionally 2- and/or 3-(halo, alkyl, alkoxy, aminocarbonyl and/or aminosulfonyl)-substituted]-[optionally 5-, 6-, 7-, 8-, 9- and/or 10-, especially mono or di (nitro, halo, sulfonic acid, sulfonic acid alkali metal salt, carboxy, amino, alkyl-sulfonylamino, alkyl-carbonylamino and/or chloro-substituted phenylcarbonylamino)-substituted]-ortho-benzo-phenazine-di-N-oxides, all but the corresponding unsubstituted compound of which are new compounds and all of which possess fungicidal properties, e.g. in a simple single step reaction using readily available starting materials whereby to attain outstanding yields, with other and further objects of the invention becoming apparent from a study of the within specification and accompanying examples.

No reaction of benzofurazan-N-oxide with a naphthol has been heretofore known.

It has now been found, in accordance with the present invention, that certain optionally substituted ortho-benzo-phenazine-di-N-oxides, all but the corresponding unsubstituted compound of which are new compounds and all of which possess fungicidal properties, of the formula

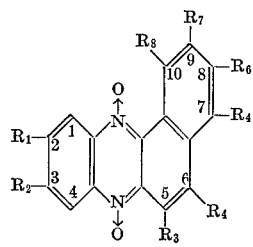

(Ia)

in which:

$R_1$ and $R_2$ are hydrogen, halo, $C_{1-4}$ alkyl, $C_{1-4}$ alkoxy, aminocarbonyl, and/or aminosulfonyl, with at least one of $R_1$ and $R_2$ preferably being hydrogen; and
$R_3$, $R_4$, $R_5$, $R_6$, $R_7$ and $R_8$ are hydrogen, or at most three of $R_3$, $R_4$, $R_5$, $R_6$, $F_7$ and/or $R_8$ are nitro, halo, $SO_3H$, $SO_3$-alkali metal, carboxy, amino, $C_{1-4}$ alkyl-sulfonyl-amino, $C_{1-4}$ alkyl-carbonylamino and/or chloro-substituted phenyl-carbonylamino;
with $R_1$ to $R_8$ preferably not all simultaneously being hydrogen;

may be prepared by a process which comprises reacting a benzofurazan-N-oxide of the formula

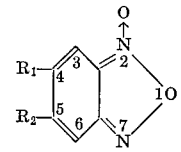

(II)

in which $R_1$ and $R_2$ are the same as defined above, with at least an equimolar amount of a naphthol of the formula

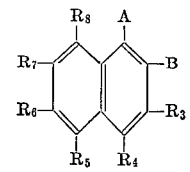

(III)

in which:

$R_3$, $R_4$, $R_5$, $R_6$, $R_7$, $R_8$ are the same as defined above, and
A is hydroxy when B is hydrogen, or
B is hydroxy when A is hydrogen, in the presence of a diluent, at a temperature of substantially between about 0 to 100° C., and in the presence of a basic-reacting agent such as a base or a basic-reacting salt, to form the corresponding benzo-phenazine-di-N-oxide, optionally with neutralization by addition of an acid after completion of the reaction.

In copending U.S. application Ser. No. 794,345 filed simultaneously herewith, an analogous process is described and claimed for the production of hydroxy-phenazine-di-N-oxides by reacting an optionally 4- and/or 5- position substituted benzofurazan-N-oxide with an optionally substituted hydroxy benzene compound in the presence of a base or basic-reacting salt, optionally in the presence of a diluent, e.g. at about 0–50° C. Such final compounds are usable as fungicidally active compounds, and all the corresponding substituted compounds are new.

Also, in copending U.S. application Ser. No. 794,347, filed simultaneously herewith, an analogous process is described and claimed for the production of hydroxy-phenazine-di-N-oxides by reacting an optionally 4- and/or 5-position substituted benzofurazan-N-oxide with an optionally substituted quinone compound in the presence of a base or basic-reacting salt and in the presence of a diluent, e.g. at about 0–100° C. Such final compounds are usable as fungicidally active compounds and all the corresponding substituted compounds are new.

It is decidedly surprising, in accordance with the present invention, that benzofurazan-N-oxides can be reacted with α- or β-naphthols to give benzo-phenazine-di-N-oxides, in a smooth manner with the splitting off of water. Such a reaction mechanism has not previously been known.

The new production process of the present invention is illustrated by the following reaction scheme:

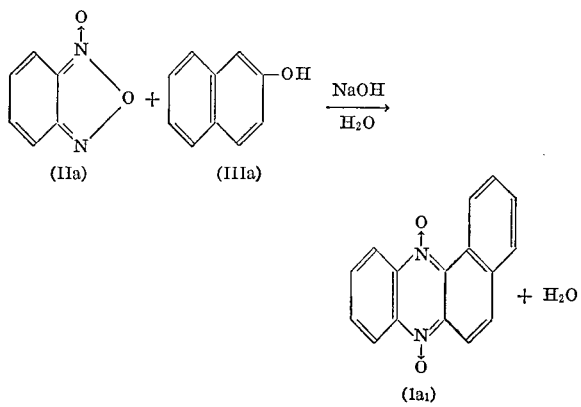

Advantageously, in accordance with the present invention, in the various formulae herein:

$R_1$ and $R_2$, each individually, represents hydrogen;
halo such as chloro, bromo, fluoro or iodo, especially chloro, bromo and fluoro, and more especially chloro;
lower alkyl of 1–4 carbon atoms such as methyl, ethyl, n- and iso-propyl, n-, iso-, sec.-, and tert.-butyl, and the like, preferably methyl, ethyl, n- and iso-propyl, and n-, iso- and sec.-butyl, especially alkyl of 1–2 carbon atoms, and more especially methyl;
lower alkoxy of 1–4 carbon atoms such as methoxy, ethoxy, n- and iso-propoxy, n-, iso-, sec.- and tert.-butoxy, and the like, preferably methoxy, ethoxy, n- and iso-propoxy, and n-, iso-, and sec.-butoxy, especially alkoxy of 1–2 carbon atoms, and more especially methoxy;
aminocarbonyl, i.e. carbamyl ($NH_2CO—$); or amino sulfonyl ($NH_2SO_2—$);

$R_3$, $R_4$, $R_5$, $R_6$, $R_7$ and $R_8$, each individually, represents hydrogen;
nitro;
halo as defined above, and more especially bromo;
$SO_3H$, i.e. sulfonic acid;
$SO_3$-alkali metal, i.e. sulfonic acid-alkali metal salt, such as sodium, potassium, lithium, etc., especially sodium and potassium, sulfonic acid salt;
carboxy (—COOH);
amino ($NH_2$—);
lower alkyl sulfonylamino having 1–4 carbon atoms in the alkyl moiety, i.e. $C_{1-4}$ alkyl-sulfonylamino, such as methyl to tert.-butyl inclusive, and the like, as defined above, sulfonylamino, especially $C_{1-2}$ alkyl sulfonylamino, and more especially methyl sulfonylamino;
lower alkyl carbonylamino having 1–4 carbon atoms in the alkyl moiety, i.e. $C_{1-4}$ alkyl-carbonylamino, such as methyl to tert.-butyl inclusive, and the like, as defined above, carbonylamino, of $C_{1-5}$ alkanoylamino, e.g. acetyl, propionyl, butyryl, pentanoyl, and the like, amino, especially $C_{1-2}$ alkyl carbonylamino, and most especially methyl carbonylamino or acetyl amino; or
chloro-substituted phenyl carbonylamino such as mono and di chloro phenyl carbonylamino, especially 2-, 3- and 4-chloro and 2,3-, 2,4-, 2,5-, 2,6-, 3,4-, and 3,5-dichlorophenylcarbonylamino, and more especially 2-chloro and 2,4-dichloro-phenylcarbonylamino;

A represents hydroxy when B is hydrogen; and B represents hydroxy when A is hydrogen.

In accordance with a preferred embodiment of the invention, at least one of $R_1$ and $R_2$ is hydrogen; and particularly $R_1$ is hydrogen and $R_2$ is hydrogen; or halo, especially chloro; $C_{1-4}$ alkyl, especially $C_{1-2}$ alkyl; $C_{1-4}$ alkoxy, especially $C_{1-2}$ alkoxy; aminocarbonyl; or amino sulfonyl; and $R_3$ to $R_8$ are hydrogen; or at least 3 or 4 are hydrogen and at most 3 or 2 are nitro; halo, especially bromo; $SO_3H$; $SO_3$-alkali metal, especially $SO_3$—Na; carboxy; amino; $C_{1-4}$, especially $C_{1-2}$, alkyl sulfonylamino; $C_{1-4}$, especially $C_{1-2}$, alkyl carbonylamino; or chloro-substituted phenyl carbonylamino, especially mono and di chloro-phenylcarbonylamino.

More especially, $R_3$ is hydrogen, $SO_3H$, $SO_3$-alkali metal, carboxy or amino; $R_4$ is hydrogen, $SO_3H$ or $SO_3$-alkali metal; one of $R_5$ to $R_7$ is bromo and the other two are hydrogen, $R_5$ and $R_7$ otherwise being hydrogen and $R_6$ otherwise being hydrogen, $SO_3H$, $SO_3$-alkali metal or nitro; and $R_8$ is hydrogen, $SO_3H$, $SO_3$-alkali metal, amino, $C_{1-4}$, especially $C_{1-2}$, alkyl sulfonylamino, $C_{1-4}$, especially $C_{1-2}$, alkylcarbonylamino, or chloro-substituted phenyl carbonylamino, especially mono to di chloro-phenyl carbonylamino.

Benzofurazan-N-oxides of Formula II above particularly suitable as starting materials for the process according to the present invention are for example: benzofurazan-N-oxide, 5-methyl-, 5-ethyl-, 5-n-propyl-, 5-n-butyl-, 5-methoxy-, 5-ethoxy-, 5-n-propoxy-, 5-n-butoxy-, 5-aminosulfonyl-, 5-carbamido- or 5-aminocarbonyl- (i.e. carbamyl-), and the like, benzofurazan-N-oxide.

Naphthols of Formula III above particularly suitable as starting materials for the process according to the present invention are for example: naphthol-(1), naphthol-(1)-sulfonic acid-(4), naphthol-(1)-disulfonic acid- (4, 8), naphthol-(2), naphthol-(2)-sulfonic acid-(4), naphthol-(2)-sulfonic acid-(6), 6-nitro-naphthol-(2)-sulfonic acid-(4), 3-hydroxy-naphtholic acid-(2)-sulfonic acid-(5), 8-amino-naphthol-(2)-sulfonic acid-(6), naphthol-(2)-disulfonic acid, 2-hydroxy-naphthoic acid-(3), 2-hydroxy-naphthoic acid-(6), 3-amino-naphthol-(2), 8-methyl-sulfonamido-naphthol-(2) or 8-methyl sulfonylamino-naphthol-(2), 8-acetylamino-naphthol-(2), 8-(2′-chloro-benzoyl-amino)-naphthol-(2), 8-(2′,4′ - dichloro-benzoyl-amino)-naphthol-(2), x - bromo-8-acetylamino-naphthol-(2), e.g. 5-, 6- or 7- bromo-8-acetylamino-naphthol-(2), and the like.

As basic-reacting agents, i.e. bases and/or basic-reacting salts for the instant process, there can be used alkali metal alcoholates, alkali metal and alkaline earth metal-hydroxides, alkali metal carbonates, alkali metal cyanides, organic amines, and mixtures of such bases.

Among the alcoholates contemplated herein are for example the alkali metal alcoholates of lower alcohols (up to 4 carbon atoms), i.e. $C_{1-4}$ alkanolates or alkylolates of Na, K, Li, and the like, in particular $KOCH_3$, $NaOCH_3$, $KOC_2H_5$, $NaOC_2H_5$ as well as $KOC_4H_9\text{-}n$ and $NaOC_4H_q=n$; and the like; and mixtures of such alcoholates.

Preferred bases are the alkali metal and alkaline earth metal hydroxides such as NaOH, KOH or $Ca(OH)_2$, $Ba(OH)_2$, $Mg(OH)_2$, and the like, and mixtures of such hydroxides.

There can also be used as bases in the process according to the present invention, as aforesaid, the carbonates and cyanides of the alkali metals, such as $Na_2CO_3$, $K_2CO_3$, NaCN, KCN, and the like, and mixtures of such carbonates and/or cyanides; as well as organic amines of the general formula

in which:

$R_9$, $R_{10}$ and $R_{11}$ are the same or different radicals such as hydrogen, alkyl (preferably with 1–12 carbon atoms), cycloalkyl (preferably with 5–6 carbon atoms), aralkyl (in which the aryl moiety is preferably phenyl, and the alkyl group preferably has 1–4 carbon atoms, e.g. benzyl), i.e. phenyl-$C_{1-4}$ alkyl, or $R_{10}$ and $R_{11}$ together with the nitrogen may form 5- or 6-membered heterocyclic ring system which may also contain, as further hereto atoms, oxygen, nitrogen or sulfur; and mixtures of such organic amines.

Preferred amines include ammonia, as well as primary, secondary and tertiary amines, including mono-, di- and tri-$C_{1-12}$ or $C_{1-4}$ alkyl amine, e.g. dimethylamine, triethylamine, butylamine, and the like; mono-, di- and tri-$C_{5-6}$ cycloalkyl amines, e.g. cyclohexylamine, dicyclohexylamine, and the like; mono-, di- and triphenyl-$C_{1-4}$ alkyl amines, e.g. benzylamine, di-(phenyl-ethyl)-amine, and the like; piperidine, morpholine, and the like; and mixtures of such amines.

In general, the bases, all of which are well-known compounds (including the basic-reacting salts), are used in at least 0.5 molar amounts, per mol of naphthol used. Such bases, however, may also be used in stoichiometric amount as well as in excess, the reaction time being considerably reduced when an excess amount of base is used.

The reaction is carried out in diluents, i.e. inert diluents, including inert solvents such as water; and organic liquids, e.g. alcohols (preferably with 1-5 carbon atoms, e.g. $C_{1-5}$ aliphatic alcohols, and especially $C_{1-5}$ alkanols), aliphatic nitriles, e.g. alkanoic nitriles, especially with 2-5 carbon atoms, e.g. acetonitrile; dialkyl, especially di $C_{1-5}$ alkyl, formamides, e.g. dimethyl formamide; ethers, e.g. aliphatic, especially cycloaliphatic, more especially $C_{4-5}$ cycloaliphatic, ethers including dioxan, tetrahydrofuran, and the like; or mixtures of such organic liquids with water, benzene or carbon tetrachloride, at a temperature of substantially between about 0 to 100° C., preferably between about 10 to 50° C., more preferably about 20 to 30° C.

The reaction may be carried out as follows:

1 mol of the benzofurazan-N-oxide and 1 mol of the hydroxynaphthalene are provided in a diluent (preferably water), and 0.5 to 20 mole of base are added, for example dropwise. The suspension of the benzofuroxazan and partially dissolved naphthol is converted in an exothermic reaction into the appropriate ortho-benzo-phenazine-di-N-oxide. The naphthols may, of course, also be used in the form of their alkali metal naphtholates, optionally in solution, without further addition of a base, i.e. in the absence of the base or basic-reacting salt (basic compound).

If the benzofurazan-N-oxide or the hydroxy-naphthalene bears acid groups, and the base used is alkali metal hydroxide, the appropriate alkali metal salts are obtained, which can be converted in the known manner into the free compounds by acidification, e.g. with inorganic acid such as HCl, $H_2SO_4$, etc.

The compounds produced according to the present invention, with the exception of ortho-benzo-phenazine-di-N-oxide, per se, are new. Such compounds correspond to the general Formula I$a$ above in which $R_1$ to $R_8$ are the same as defined above.

The compounds produced by the instant process represent valuable intermediates for dyestuffs and plant protection agents.

Advantageously, the so-produced compounds can also be used directly as fungicides, i.e. active compounds for the control of phytopathogenic, seed-born fungi, such as *Tilletia tritici, Ustilago avenae, Ustilago tritici, Fusarium nivale, Helminthosporium gramineum;* and the like. In this case, the seed to be protected is treated in the usual manner with a dressing which contains as active compound the compounds produced according to the present invention.

The active compounds produced according to the instant invention can be utilized, if desired, in the form of the usual formulations or compositions with inert conventional pesticidal diluents or extenders, i.e. conventional pesticidal dispersible carrier vehicles, such as solutions, emulsions, suspensions, emulsifiable concentrates, spray powders, pastes, soluble powders, dusting agents, granules, etc. These are prepared in known manner, for instance by extending the active compounds with inert conventional pesticidal dispersible liquid diluent carriers and/or dispersible solid carriers optionally with the use of carrier vericle assistants, e.g. conventional pesticidal surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers, including inert organic solvents, such as aromatic hydrocarbons (e.g. benzene, toluene, xylene, etc.), halogenated especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), amines (e.g. ethanolamine, etc.), ethers, ether-alcohols (e.g. glycol monomethyl ether, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds produced according to the instant invention may be employed alone or in the form of mixtures with one another and/or with such solid and/or liquid dispersible carrier vehicles and/or with other known compatible active agents, especially plant protection agents, such as other fungicides, or acaricides, insecticides, nematicides, herbicides, bactericides, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1-95% and preferably 0.5-90%, by weight of the mixture, whereas carrier composition mixtures suitable for direct application or field application generally contemplate those in which the active compound is present in an amount substantially between about 0.01-50%, preferably 10-35%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.1-95%, and preferably 10-95%, by weight of the mixture.

The active compounds can also be used in accordance with the well-known ultra-low-volume process with good success, i.e. by applying such compound if normally a liquid, or by applying a liquid composition containing the same, via very effective atomizing equipment in finely divided form, e.g. average particle diameter of from 50-100 microns, or even less, i.e. mist form, for example by airplane crop spraying techniques. Only up to at most about a few liters/hectare are needed, and often amounts only up to about 1 quart/acre, preferably 2-16 fluid ounces/acre, are sufficient. In this process it is possible to use highly concentrated liquid compositions with said liquid carrier vehicles containing from about 20 to about 95% by weight of the active compound or even the 100% active substance alone, e.g. about 20-100% by weight of the active compound.

Furthermore, the present invention contemplates methods of selectively killing, combating or controlling fungi, which comprise applying to at least one of (a) such fungi and (b) their habitat, i.e. the locus to be protected, e.g. seeds, a combative or toxic amount, i.e. a fungicidally effective or toxic amount, of the particular active compound of the invention alone or together with a carrier vehicle as noted above. The instant formulations or compositions are applied in the usual manner, for instance by spraying, atomizing, vaporizing, fumigating, scattering, dusting, watering, sprinkling, pouring, as seed dressing, and the like.

For seed dressing purposes, generally about 0.1–10, preferably 0.5–2 grams of active compound per kilogram of seed, are used.

It will be realized, of course, that the concentration of the particular active compound utilized in admixture with the carrier vehicle will depend upon the intended application. Therefore, in special cases, it is possible to go above or below the aforementioned concentration ranges.

The fungicidal activity of the active compounds produced by the process of the present invention is illustrated, without limitation, by the following example.

EXAMPLE 1

Seed dressing test/bunt of wheat (seed-born mycosis)

To produce a suitable dry dressing, the particular active compound is extended with a mixture of equal parts by weight of talc and kieselguhr to give a finely powdered mixture with the desired concentration of such active compound.

Wheat seed is contaminated with 5 g. of the chlamydospores of *Tilletia caries* per kg. of seed. To apply the dressing, the seed is shaken with the dressing in a closed glass flask. The seed, on moist loam under a cover of a layer of muslin and 2 cm. of moderately moist compost soil, is exposed to optimum germination conditions for the spores for 10 days at 10° C. in a refrigerator.

The germination of the spores on the wheat grains, each of which is contaminated with about 100,000 spores, is subsequently determined microscopically. The smaller the number of spores which have germinated, the more effective is the given active compound.

The particular active compounds tested, their concentration in the dressing, the amount of dressing used and the percentage spore germination obtained can be seen from the following Table 1:

TABLE 1.—SEED DRESSING TEST/BUNT OF WHEAT

| Active compound | Concentration of active compound in the dressing in percent by weight | Amount applied of dressing in g./kg. seed | Spore germination in percent |
|---|---|---|---|
| (1a₂) | 30 | 1 | 0.000 |
| (2₁) | 30 | 1 | 0.05 |
| (3₁) H₂NSO₂— | 30 | 1 | 0.05 |

The following further examples are set forth to illustrate, without limitation, the process according to the present invention for producing the instant compounds:

EXAMPLE 2

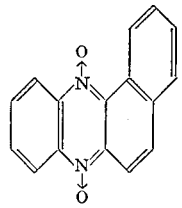

(1a₃)

13.6 g. (0.1 mol) of finely powdered benzofurazan-N-oxide and 14.4 g. (0.1 mol) naphthol-(2) are suspended in 200 ml. water. 40 g. of a 10% solution of sodium hydroxide (0.1 mol) are added dropwise thereto and stirring is effected for 7 hours. During this time the temperature rises to 28° C., and from the yellow suspension an orange-colored slurry is formed. After suction filtration, 24 g. (91.6% of the theory) of ortho-benzo-phenazine-di-N-oxide are obtained as orange-yellow crystals which, after recrystallization from dimethyl formamide (DMF), decompose at 191° C.

*Analysis.*—Calcd. for $C_{16}H_{10}N_2O_2$ (molecular weight 262) (percent): C, 73.3; H, 3.8; N, 10.7. Found (percent): C, 73.0; H, 3.9; N, 10.7.

EXAMPLE 3

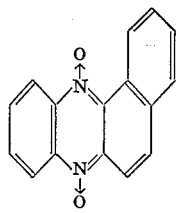
(1a₄)

13.6 g. (0.1 mol) of finely powdered benzofurazan-N-oxide and 14.4 g. (0.1 mol) of naphthol-(2) are suspended in 200 ml. water. 50 g. of 40% solution of sodium hydroxide (0.5 mol) are added dropwise thereto, and stirring is effected for 1 hour. The temperature is kept below 30° C. by occasional cooling with ice. After suction filtration, 25 g. (95.5% of the theory) of ortho-benzo-phenazine-di-N-oxide of decomposition point 173° C. are obtained. After recrystallization from dimethyl formamide (DMF), the substance decomposes at 191° C.

In an analogous manner there were prepared:

| | | Color | Decomp. point, °C. | Yield, percent | Recrystallized from— |
|---|---|---|---|---|---|
| (4₁) | | Yellow | 193–94 | 72 | DMF |
| (2₂) | | Yellow | 166–67 | 68.9 | DMF |
| (5₁) | | Orange-red | 184–85 | 92.5 | DMF |
| (6₁) | | Yellow | 232 | 95.6 | DMF |
| (7₁) | | Orange-red | 192 | 87.8 | DMF |
| (8₁) | | Orange-yellow | 222 | 94 | DMF |

| | Color | Decomp. point, °C. | Yield, percent | Recrystallized from— |
|---|---|---|---|---|
| (9₁) 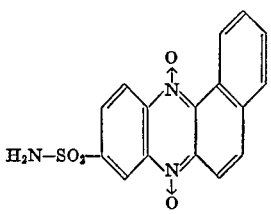 | Red | 242 | 95.7 | DMF |
| (10₁) 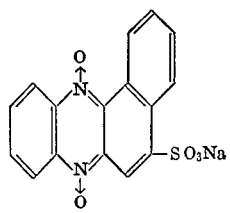 | Orange-red | 191–92 | 55.3 | DMF |

EXAMPLE 4

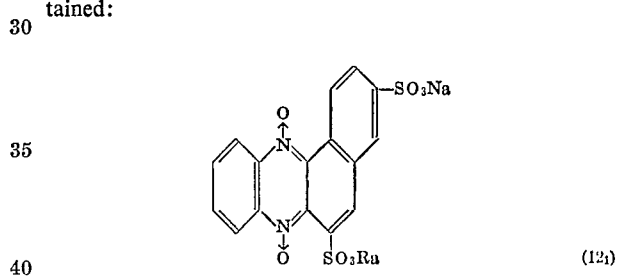

(3₂)

19.5 g. (0.1 mol) 5-sulfonamido- benzofurazan-N-oxide and 14.4 g. (0.1 mol) naphthol-(2) are suspended in 200 ml. of water and 80 g. of 10% solution of sodium hydroxide (0.2 mol) are added dropwise. A dark solution is formed during the exothermic reaction. After 4 hours, filtration is effected and the filtrate is acidified with 10% hydrochloric acid. 32 g. (93.8% of the theory) of 3-sulfonamido-ortho-benzo-phenazine-di-N-oxide, as yellow crystals are obtained, which, after recrystallization from DMF, melt at 250° C., with decomposition.

*Analysis.*—Calcd. for $C_{16}H_{11}N_3O_4S$ (molecular weight 341) (percent): C, 56.5; H, 3.2; N, 12.3. Found (percent): C, 56.4; H, 3.5; N, 12.6.

EXAMPLE 5

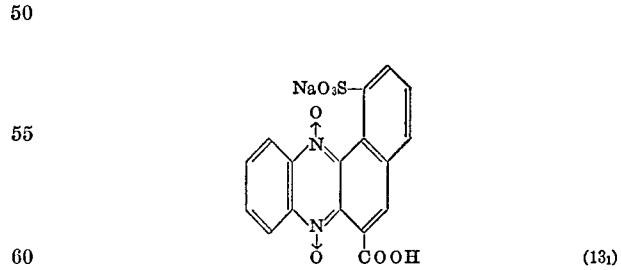

(11₁)

13.6 g. (0.1 mol) benzofurazan-N-oxide and 25 g. (0.1 mol) naphthol-(2)-sulfonic acid-(4)-sodium salt are suspended in 200 ml. of water and 40 g. of 10% solution of sodium hydroxide (0.1 mol) are added dropwise. After 8 hours, suction filtration is effected, and 27 g. (65.8% of the theory) of orthobenzo-phenazine-di-N-oxide-6-sulfonic acid sodium salt, as orange-red crystals, which can be recrystallized from water, are obtained.

*Analysis.*—Calcd. for $C_{16}H_9N_2NaO_5S \cdot 2H_2O$ (molecular weight 410) (percent): C, 46.9; H, 3.17; N, 6.8. Found (percent): C, 47.1; H, 3.5; N, 7.0.

The same compound is formed similarly from naphthol-(1)-sulfonic acid-(4)-sodium salt and benzofurazan-N-oxide in a yield of 50% of the theory.

Analogously, from naphthol-(2)-disulfonic acid-(3,6)-di sodium salt and benzofurazan-N-oxide there is obtained:

(12₁)

i.e. ortho-benzo-phenazine-di-N-oxide-5,8-disulfonic acid-di sodium salt, as orange-yellow crystals, which were recrystallized from water. Yield: 40% of the theory.

*Analysis.*—Calcd. for $C_{16}H_8N_2Na_2O_8$ (molecular weight 402) (percent): C, 47.7; H, 1.90; N, 6.9. Found (percent): C, 47.1; H, 2.4; N, 7.3.

EXAMPLE 6

(13₁)

13.6 g. (0.1 mol) benzofurazan-N-oxide and 26.8 g. (0.1 mol) 3-hydroxy-naphthoic acid-(2)-sulfonic acid-(5) are suspended in 200 ml. of water. 120 g. of a 10% solution of sodium hydroxide (0.3 mol) are added dropwise thereto, and stirring is effected for 18 hours at room temperature. After suction filtration, 16 g. (39.2% of the theory) of 5-carboxy-ortho-benzophenazine-di-N-oxide-10-sulfonic acid sodium salt, in the form of orange-red crystals, which can be recrystallized from water, are obtained.

*Analysis.*—Calcd, for $C_{17}H_9N_2NaO_7S$ (molecular weight 408) (percent): C, 50.0; H, 2.2; N, 6.1. Found (percent): C, 49.7; H, 3.3; N, 6.1.

EXAMPLE 7

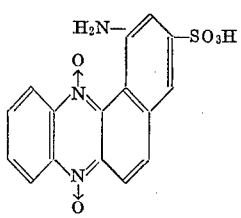

(14₁)

13.6 g. (0.1 mol) benzofurazan-N-oxide and 23.9 g. (0.1 mol) 8-amino-naphthol-(2)-sulfonic acid-(6) are suspended in 200 ml. of water. 80 g. of 10% solution of sodium hydroxide (0.2 mol) are added dropwise thereto and stirring is effected for 4 hours. After suction filtration, 31 g. of red-violet crystals are obtained which, when stirred in dilute hydrochloric acid, are converted into 8-sulfonic acid-10-amino-ortho-benzophenazine-di-N-oxide in the form of yellow crystals.

Analysis.—Calcd. for $C_{16}H_{11}N_3O_5S$ (molecular weight 357) (percent): C, 53.7; H, 3.0; N, 11.8. Found (percent): C, 53.6; H, 3.4; N, 12.0.

EXAMPLE 8

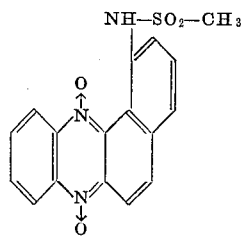

(15₁)

13.6 g. (0.1 mol) benzofurazan-N-oxide and 23.7 g. (0.1 mol) 8-methanesulfonylamino-2-hydroxy-naphthalene are suspended in 200 ml. of water. 40 g. of 10% solution of sodium hydroxide (0.1 mol) are added dropwise thereto, and stirring is effected for 4 hours at room temperature. After suction filtration, 18 g. (50.7% of the theory) of 10-methylsulfonylamino-orthobenzo-phenazine-di-N-oxide in the form of red-brown crystals are obtained which, after recrystallization from acetonitrile/DMF (2:1), melt at 196° C., with decomposition.

Analysis.—Calcd. for $C_{17}H_{13}N_3O_4S$ (molecular weight 355) (percent): N, 11.8. Found (percent): N, 11.9.

EXAMPLE 9

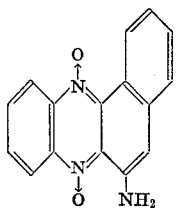

(16₁)

13.6 g. (0.1 mol) benzofurazan-N-oxide and 25.9 g. (0.1 mol) 3-amino-2-hydroxy-naphthalene are suspended in 200 ml. of water. 40 g. of a 10% solution of sodium hydroxide (0.1 mol) are added dropwise thereto, and stirring is effected for 5 hours at room temperature. A black-violet suspension is formed. After suction filtration, 20 g. (72.3% of the theory) of 5-amino-ortho-benzophenazine-di-N-oxide in the form of black-violet crystals are obtained which, after recrystallization from dimethyl formamide, melt at 184° C., with decomposition.

Analysis.—Calcd. for $C_{16}H_{11}N_3O_2$ (molecular weight 277) (percent): C, 69.3; H, 3.9; N, 15.1. Found (percent): C, 68.3; H, 4.2; N, 14.9.

EXAMPLE 10

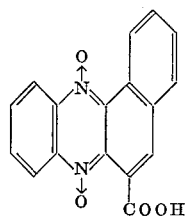

(17₁)

13.6 g. (0.1 mol) benzofurazan-N-oxide and 19 g. (0.1 mol) 2-hydroxy-naphthalene-carboxylic acid-(3) are suspended in 200 ml. of water. 80 g. of a 10% solutin of sodium hydroxide (0.2 mol) are added dropwise thereto, and stirring is effected for 3 hours at room temperature. The precipitate obtained after suction filtration is stirred in dilute hydrochloric acid, and 12 g. of 5-carboxy-ortho-benzo-phenazine-di-N-oxide in the form of yellow crystals are obtained which, after recrystallization from dimethyl sulfoxide, melt at 212° C., with decomposition. From the filtrate there are obtained, when acidification with 10% hydrochloric acid is effected, a further 11 g. Total yield 75.2% of the theory.

Analysis.—Calcd. for $C_{17}H_{10}N_2O_4$ (molecular weight 306) (percent): C, 66.6; H, 3.2; N, 9.1. Found (percent): C, 66.4; H, 3.6; N, 9.1.

EXAMPLE 11

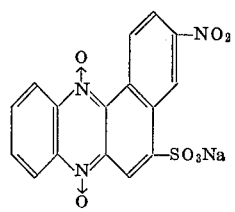

(18₁)

13.6 g. (0.1 mol) benzofurazan-N-oxide and 29 g. (0.1 mol) 6-nitro-naphthol-(2)-sulfonic acid-(4)sodium salt are suspended in 300 ml. of water. 40 g. of a 10% solution of sodium hydroxide are added dropwise thereto, and stirring is effected for 8 hours at room temperature. After suction filtration, 13 g. (31.2% of the theory) of 8-nitro-ortho-benzo-phenazine-di-N-oxide-6-sulfonic acid sodium salt in the form of yellow crystals are obtained which, after recrystallization from water, decompose at 208° C.

Analysis.—Calcd. for $C_{16}H_8N_3NaO_7 \cdot H_2O$ (molecular weight 417) (percent): C, 46.6; H, 2.4; N, 10.1. Found (percent): C, 46.6; H, 2.5; N, 10.3.

It will be realized by the artisan that all of the foregoing compounds contemplated by the present invention, i.e. produced by the instant process, possess the desired strong fungicidal properties, with regard to a broad spectrum of activity, as well as a comparatively low toxicity toward warm-blooded creatures and a concomitantly low phytotoxicity, enabling such compounds to be used with correspondingly favorable compatibility with warm-blooded creatures and plants for more effective control and/or elimination of fungi by application of such compounds to such fungi and/or their habitat.

It will be appreciated that the instant specification and examples are set forth by way of illustration and not limitation, and that various modifications and changes may be made without departing from the spirit and scope of the present invention.

What is claimed is:
1. Process for the production of ortho-benzo-phenazine-di-N-oxide of the formula

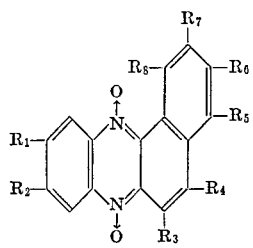

in which $R_1$ and $R_2$, each individually, is selected from the group consisting of hydrogen, halo, alkyl of 1–4 carbon atoms, alkoxy of 1–4 carbon atoms, aminocarbonyl and aminosulfonyl, and $R_3$, $R_4$, $R_5$, $R_6$, $R_7$ and $R_8$, each individually, is selected from the group consisting of hydrogen, nitro, halo, $SO_3H$, $SO_3$-alkali metal, carboxy, amino, alkylsulfonylamino having 1–4 carbon atoms in the alkyl moiety, alkylcarbonylamino having 1–4 carbon atoms in the alkyl moiety, and chloro-substituted phenyl carbonylamino, which comprises reacting a benzofurazan-N-oxide of the formula

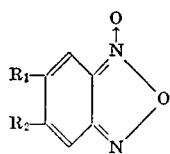

in which $R_1$ and $R_2$ are the same as defined above, with at least an equimolar amount of a naphthol of the formula

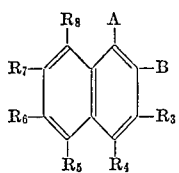

in which $R_3$, $R_4$, $R_5$, $R_6$, $R_7$ and $R_8$ are the same as defined above, and A is hydroxy when B is hydrogen whereas B is hydroxy when A is hydrogen, in the presence of a basic-reacting compound selected from the group consisting of a base and a basic-reacting salt, and in the presence of a diluent, at a temperature from about 0–100° C., to form the corresponding ortho-benzo-phenazine-di-N-oxide.

2. Process according to claim 1 wherein after completion of the reaction, neutralization of the reaction mixture is carried out by addition of acid.

3. Process according to claim 1 wherein said reacting is carried out at a temperature from about 10–50° C.

4. Process according to claim 1 wherein said basic compound is selected from the group consisting of alkali metal alcoholate, alkali metal hydroxide, alkaline earth metal hydroxide, alkali metal carbonate, alkali metal cyanide, ammonia, organic amine, and mixtures thereof.

5. Process according to claim 1 wherein said basic compound is selected from the group consisting of alkali metal $C_{1-4}$ alkanolates, alkali metal hydroxide, alkaline earth metal hydroxide, alkali metal carbonate, alkali metal cyanide, organic amine of the formula

in which $R_9$, $R_{10}$ and $R_{11}$, each individually, is selected from the group consisting of hydrogen, $C_{1-12}$ alkyl, $C_{5-6}$ cycloalkyl, phenyl-$C_{1-4}$ alkyl, with the proviso that $R_{10}$ and $R_{11}$ when taken together with the adjacent nitrogen atom form a member selected from the group consisting of piperidino and morpholino, and mixtures of such basic compounds.

6. Process according to claim 1 wherein said basic compound is alkali metal hydroxide.

7. Process according to claim 1 wherein said basic compound is sodium hydroxide.

8. Process according to claim 1 wherein said naphthol is used in the form of the corresponding alkali metal naphtholate and said reaction is carried out in the absence of said basic compound.

9. Process according to claim 1 wherein said diluent is an inert liquid selected from the group consisting of water and inert organic liquids.

10. Process according to claim 1 wherein said diluent is an inert liquid selected from the group consisting of water, aliphatic alcohols, aliphatic nitriles, dialkyl formamides, cycloaliphatic ethers and mixtures of the foregoing alcohols, nitriles, formamides and ethers with a member selected from the group consisting of water, benzene and carbon tetrachloride.

11. Process according to claim 1 wherein said diluent is an inert liquid selected from the group consisting of water, $C_{1-5}$ alkanols, $C_{2-5}$ alkanoic nitriles, di $C_{1-5}$ alkyl formamides, $C_{4-5}$ cycloaliphatic ethers, and mixtures of said alkanols, nitriles, formamides and ethers with a member selected from the group consisting of water, benzene and carbon tetrachloride.

12. Process according to claim 1 wherein said reacting is carried out with 0.5–20 mols of said basic compound per mol of said benzofuroxazan.

13. Process according to claim 1 wherein said reacting is carried out with 0.5–20 mols of sodium hydroxide in the form of an aqueous solution, per mol of said benzofurazan-N-oxide in the presence of water as diluent.

14. Process according to claim 1 wherein at least one of $R_1$ and $R_2$ is hydrogen, and at least 3 of $R_3$, $R_4$, $R_5$, $R_6$, $R_7$ and $R_8$ are hydrogen.

15. Process according to claim 1 wherein $R_1$ is hydrogen and $R_2$ is selected from the group consisting of hydrogen, halo, alkyl of 1–4 carbon atoms, alkoxy of 1–4 carbon atoms, aminocarbonyl and aminosulfonyl, and at least 4 of $R_3$, $R_4$, $R_5$, $R_6$, $R_7$ and $R_8$ are hydrogen and at most 2 thereof correspondingly are selected from the group consisting of nitro, halo, $SO_3H$, $SO_3$-alkali metal, carboxy, amino, alkyl sulfonylamino having 1–4 carbon atoms in the alkyl moiety, alkyl carbonylamino having 1–4 carbon atoms in the alkyl moiety, and chloro-substituted phenyl carbonylamino.

16. Process according to claim 1 wherein $R_1$ is hydrogen and $R_2$ is selected from the group consisting of hydrogen, chloro, $C_{1-2}$ alkyl, $C_{1-2}$ alkoxy, aminocarbonyl and amino sulfonyl, and at least 4 of $R_3$, $R_4$, $R_5$, $R_6$, $R_7$ and $R_8$ are hydrogen and at most 2 thereof correspondingly are selected from the group consisting of nitro, bromo, $SO_3H$, $SO_3$-alkali metal, carboxy, amino, $C_{1-2}$ alkyl sulfonyl amino, $C_{1-2}$ alkyl carbonylamino, and mono and di chloro-phenyl carbonylamino.

17. Process according to claim 1 wherein $R_1$ is hydrogen and $R_2$ is selected from the group consisting of hydrogen, chloro, $C_{1-2}$ alkyl, $C_{1-2}$ alkoxy, amino carbonyl and amino sulfonyl, $R_3$ is selected from the group consisting of hydrogen, $SO_3H$, $SO_3$-alkali metal, carboxy and amino, $R_4$ is selected from the group consisting of hydrogen, $SO_3H$ and $SO_3$-alkali metal, one of $R_5$ to $R_7$ is bromo when the remaining 2 thereof are hydrogen, $R_5$ and $R_7$ otherwise being hydrogen and $R_6$ otherwise being selected from the group consisting of hydrogen, $SO_3H$, $SO_3$-alkali metal and nitro, and $R_8$ is selected from the group consisting of hydrogen, $SO_3H$, $SO_3$-alkali metal, amino, $C_{1-2}$ alkyl sulfonylamino, $C_{1-2}$ alkyl carbonylamino, and mono and di chloro-phenyl carbonylamino.

References Cited

UNITED STATES PATENTS 3,485,832  12/1969  Harris et al. _____ 260—267

ALEX MAZEL, Primary Examiner

A. M. T. TIGHE, Assistant Examiner

U.S. Cl. X.R.

260—307; 424—250